United States Patent [19]

Boeller et al.

[11] Patent Number: 4,937,156

[45] Date of Patent: Jun. 26, 1990

[54] PROCESS FOR INTRODUCING A HARDENING SULFURIC ACID ELECTROLYTE INTO BATTERY CELLS

[75] Inventors: Klaus Boeller, Osterode; Gerd Poesch; Gerd Hoogestraat, both of Bad Lauterberg, all of Fed. Rep. of Germany

[73] Assignee: DETA-Akkumulatorenwerk GmbH, Bad Lauterberg, Fed. Rep. of Germany

[21] Appl. No.: 302,882

[22] Filed: Jan. 30, 1989

[30] Foreign Application Priority Data

Jan. 28, 1988 [EP] European Pat. Off. ........ 88101221.5

[51] Int. Cl.$^5$ ............................................. H01M 10/10
[52] U.S. Cl. ...................................... 429/189; 429/190
[58] Field of Search ........................... 429/52, 189, 190

[56] References Cited

U.S. PATENT DOCUMENTS

| | | | |
|---|---|---|---|
| 3,305,396 | 2/1967 | Rauter | 429/190 |
| 3,402,077 | 9/1968 | Kida et al. | 429/190 |
| 3,776,779 | 12/1973 | Johnson | 136/157 |
| 4,391,036 | 7/1983 | Kishimoto et al. | 429/190 |

FOREIGN PATENT DOCUMENTS 3539834  5/1987  Fed. Rep. of Germany .
166707   7/1921  United Kingdom .
571305   8/1945  United Kingdom .

*Primary Examiner*—Donald L. Walton
*Attorney, Agent, or Firm*—Foley & Lardner, Schwartz, Jeffery, Schwaab, Mack, Blumenthal & Evans

[57] ABSTRACT

A process for introducing a hardening sulfuric acid electrolyte into battery cells at a sulfuric acid density of between 1.20 and 1.31, comprises the steps of combining (A) sulfuric acid, optionally together with up to 3% by weight of suspended silica;

(B) a suspension of 6–12% by weight of silica in water; and (C) a water-in-oil emulsion of a polymer polyelectrolyte, in such proportions that the resultant mixture has concentrations of 3–5% by weight of silica and 0.1–1.0% by weight of polymer, and a sulfuric acid density of from 1.20 to 1.31, and intensively mixing the resultant mixture of components A, B and C at a mixing energy of 1–10 kJ/m$^3$, whereby inversion of the mixture to an oil-in-water emulsion is initiated; and then immediately filling the mixture into battery cells.

The starting components A, B, and C can be stored for a prolonged period. After leaving the mixer, the mixture hardens after about 120–180 seconds.

13 Claims, No Drawings

PROCESS FOR INTRODUCING A HARDENING SULFURIC ACID ELECTROLYTE INTO BATTERY CELLS

BACKGROUND OF THE INVENTION

The invention relates to a process for introducing a hardening sulfuric acid electrolyte into battery cells at a sulfuric acid density of between 1.20 and 1.31, using a water-in-oil emulsion with a polymer as a polyelectrolyte in the water phase, preferably with a polymer or copolymer of an acrylamide, the emulsion together with a sulfuric acid/silica mixture being inverted to give an oil-in-water emulsion which ten hardens.

German Offenlegungsschrift No. 3,539,834 discloses a similar process, wherein three components are used, viz., sulfuric acid, silica and a polymer polyelectrolyte emulsion. Silica is a pulverulent solid and is mixed with the sulfuric acid. The emulsion is then added. Thus, there are two liquid components, namely the mixture of sulfuric acid with silica, and the emulsion.

The use of a water-in-oil emulsion, which is subsequently inverted to give an oil-in-water emulsion, has the advantage that, because of the intervening inversion step, sufficient time is available for the transfer from the liquid phase into the hardened phase, so that the electrolyte can be filled into the battery cells in the thickened but still liquid state and hardened only after the end of the intervening inversion step.

However, when this process is used in practice, there is the disadvantage that the sulfuric acid/silica mixture required as the starting component quickly hardens itself, so that its storage life is relatively short. In fact, the mixture will harden to such a high viscosity after 30 to 90 minutes that the filling of the battery will no longer be possible.

There presently exists a need for a method of introducing a hardening sulfuric acid electrolyte into battery cells which will enable the separate components to be mixed thoroughly, wherein each component will have a relatively long shelf life prior to mixing.

OBJECTS OF THE INVENTION

One object of the present invention is to develop a process for introducing a hardening sulfuric acid electrolyte into battery cells in such a way that long storage life of the starting components, good filling properties of the mixture prepared and reliable solidification of the electrolyte filled in are achieved.

Another object of the invention is to provide an electrolyte filling kit for use in preparing a hardening sulfuric acid electrolyte which comprises three separate components having a long shelf life, namely sulfuric acid, a suspension of silica, and a water-in-oil emulsion of a polymer polyelectrolyte.

Upon further study of the specification and appended claims, further objects and advantages of this invention will become apparent to those skilled in the art.

SUMMARY OF THE INVENTION

These and other objects are achieved by a process of the type mentioned at the outset, which comprises the steps of combining:
(A) sulfuric acid, optionally together with up to 3% by weight of suspended silica;
(B) a suspension of 6–12% by weight of silica in water; and
(C) a water-in-oil emulsion of a polymer polyelectrolyte;

in such proportions that the resultant mixture has concentrations of 3–5% by weight of silica and 0.1–1.0% by weight of polymer, and a sulfuric acid density of from 1.20 to 1 31, and intensively mixing the resultant mixture of components A, B and C at a mixing energy of 1–10 kJ/m$^3$, whereby inversion of the mixture to an oil-in-water emulsion is initiated; and then immediately filling the mixture into battery cells.

Additionally, an electrolyte filling kit for storing the components is also provided. This kit comprises, in separate containers:
(A) sulfuric acid at a concentration of 50–80% by weight, optionally together with up to 3% by weight of suspended silica;
(B) a suspension of 6–12% by weight of silica in water; and
(C) a water-in-oil emulsion of a poly electrolyte which is a polymer or copolymer of acrylamide having a weight average molecular weight of at least 1,000,000 daltons, wherein said emulsion has a polymer content of 20–60% by weight, a density of $\rho = 1.03 \pm 0.02$ g/ml and a viscosity of $\eta = 300 \pm 100$ mPa.s.

DETAILED DESCRIPTION OF THE PREFERRED EMBODIMENTS

The starting components A, B, and C used according to the invention have a long storage life in the liquid form or, if appropriate, a somewhat thickened form. They can be mixed within several days of preparation. The end concentrations of the electrolyte filled in insure, together with the mixing energy introduced into the mixture, that the mixture can readily be filled in and subsequently hardened reliably in the battery cell.

The starting component A is sulfuric acid to which, preferably, a small proportion of silica has been admixed. The amount of the admixture depends on the concentration of the sulfuric acid used. Very highly concentrated sulfuric acid allows only a small admixture of silica or none at all, whereas, in the case of a relatively weak concentrated sulfuric acid (for example 60 percent), the indicated upper limit of 3% by weight of silica can be added without the starting component losing storage life due to hardening. The sulfuric acid used in the starting component A can thus be, for example, 50–80 percent sulfuric acid by weight. All the starting components preferably have viscosities between 2 and 9 mPa.s.

The starting component B contains the remainder of the required silica, namely between 6 and 12% by weight, which is necessary to reach the desired end concentration of 3–5% by weight of silica in the electrolyte once filled in.

In a preferred embodiment of the present invention, the silica content is 1.3 – 1.5% by weight in the first starting component A and 8% by weight in the second starting component B, deionized water being preferably used for preparing the suspension in the second starting component B.

The silica used is preferably pyrogenic $SiO_2$, silica of the hydrophilic type being preferably used. Hydrophobic silica with surfactants as additives can here be added to the hydrophilic silica, as has also already been explained in German Offenlegungsschrift No. 3,539,834. The hydrophobic silica can be made, e.g., by silanizing normally hydrophilic silica, using conventional silanizing reagents. Conventional surfactants, normally longchain molecules having a lipophilic end and a hydrophilic end, are used. They serve the purpose of bridging and crosslinking aggregates of hydrophilic and hydrophobic silica. Addition of hydrophobic silica and surfactants permits a reduction in the total amount of silica in the mixture and delays hardening.

A water-in-oil emulsion with a polymer or copolymer of an acrylamide, preferably having a weight average molecular weight of at least 1,000,000 daltons, and a polymer content in the emulsion of 20-60%, a density of $\rho = 1.03 \pm 0.02$ g/ml and a viscosity of $\eta = 300 \pm 100$ mPa s (milliPascal second) is preferred. An end concentration of 0.1-1.0% of the polymer is preferred once all three components are mixed.

The three starting components are preferably mixed in a ratio of 40-70% by weight of starting component A, 30-60% by weight of starting component B and 0.15-1.5% by weight of starting component C, relative to the total weight of the resultant mixture. An overall preferred combination is about 60% by weight of starting component A, about 39% by weight of starting component B and about 1% by weight of starting component C.

The three starting components are put into a mixer in which they are mixed virtually simultaneously with one another at a mixing energy of 1-10 kJ/m$^3$. A preferred value of the mixing energy introduced into the mixture is 2-5 kJ/m$^3$, which in turn insures optimum behavior of the mixture upon filling and hardening.

For blending the components, static as well as stirring mixers can be used. The mixing energy can be determined with a stirring mixer by measuring the electrical energy and determining the efficiency of the mixer. In a static mixer into which the components are injected by pumps, the mixing energy introduced into the mixer can be determined by the pressure drop at the inlet and outlet of the mixer, i.e., the mixing energy can be determined by measuring the velocities and pressures of the components at the input of the static mixer, and measuring the velocity and the pressure of the blend at the output of the mixer (comparison of input and output energy; the energy difference is the mixing energy). In a stirring mixer the mixing energy can be controlled by controlling the flow rate at a constant mixing speed or by controlling the mixing speed at a constant flow rate. In a static mixer different flow rates will produce different mixing energies.

Preferred end concentrations of an electrolyte intended for filling tubular plate batteries are about 0.4% by weight of the polymer and about 4% by weight of the silica, the sulfuric acid density being adjusted to 1.28.

The mixture passes in a highly viscous form into the battery cells. In this form, liquids tend to occlude air bubbles. Occluded air bubbles interfere with ionic conduction in the electrolyte and are therefore undesirable. According to a preferred embodiment of the invention, while the electrolyte emulsion is being introduced, the battery cells are alternately subjected to a higher pressure and a lower pressure. Preferably, a vacuum of 50-80 kPa is generated here as the lower pressure, preferably with intervening admission of air up to atmospheric pressure. The repeating frequency for generating the vacuum is preferably between 0.2 and 1 Hz.

The periodic generation of a vacuum and admission of air lead to a periodic increase and decrease in the volume of the air bubbles. These then migrate to the surface in the highly viscous electrolyte, burst and disappear when a vacuum is applied again. The filling of the space between the battery plates by means of the hardening electrolyte is therefore substantially improved by the measure according to the invention of periodically applying a vacuum.

Hardening of the gel according to the invention takes place within 120-180 seconds after emergence from the mixer. The filling into the battery cells takes only a fraction of this time. The pulsating application of vacuum is preferably continued for about one further minute after the end of the filling step.

As part of the invention, an electrolyte filling kit is also provided for preparing a preferred hardening sulfuric acid electrolyte for introduction into battery cells. The kit comprises three components in separate containers, each of which has a relatively long shelf life. These are (A) sulfuric acid at a concentration of 50-80% by weight, optionally together with up to 3% by weight of suspended silica; (B) a suspension of 6-12% by weight of silica in water; and (C) a water-in-oil emulsion of a polyelectrolyte which is a polymer or copolymer of acrylamide having a molecular weight of at least 1,000,000, wherein said emulsion has a polymer content of 20-60% by weight, a density of $\rho = 1.03 \pm 0.02$ g/ml and a viscosity of $\eta = 300 \pm 100$ mPa s. These components of the kit may further contain preferred and/or additional ingredients and/or preferred proportions of ingredients, as noted above with regard to components used in the process of the invention.

Without further elaboration, it is believed that one skilled in the art can, using the preceding description, utilize the present invention to its fullest extent and easily ascertain its essential characteristics, and can, without departing from the spirit and scope thereof, make various changes and modifications of the invention to adapt it to various usages and conditions.

What is claimed is:

1. A process for introducing a hardening sulfuric acid electrolyte into battery cells at a sulfuric acid density of between 1.20 and 1.31, which comprises the sequential steps of:
   (A) combining three initially separate stable components, wherein said components are
      (i) sulfuric acid at a concentration of 50-80% by weight;
      (ii) a suspension of 6-12% by weight of silica in water; and
      (iii) a water-in-oil emulsion of a polyelectrolyte which is a polymer or copolymer of acrylamide having a weight average molecular weight of at least 1,000,000 daltons, wherein said emulsion has a polymer content of 20-60% by weight, a density of $\rho = 1.03 \pm 0.02$ g/ml and a viscosity of $\eta = 300 \pm 100$ mPa.s,
   in such proportions that the resultant mixture has concentrations of 3-5% by weight of silica and 0.1-1.0% by weight of polymer, and a sulfuric acid density of from 1.20 to 1.31;
   (B) intensively mixing the resultant mixture of components (i), (ii) and (iii) at a mixing energy capable of initiating inversion of the mixture to an oil-in-water emulsion; and
   (C) immediately filling the mixture into battery cells while the latter are alternately subjected to a higher and a lower pressure.

2. The process as claimed in claim 1, wherein the lower pressure is a vacuum.

3. The process as claimed in claim 2, wherein air is admitted to the battery cells up to atmospheric pressure each time after they have been subjected to a vacuum.

4. The process as claimed in claim 2, wherein a vacuum of 50-80 kPa is generated.

5. The process as claimed in claim 2, wherein the repeating frequency for generating the vacuum is between 0.2 and 1 Hz.

6. An electrolyte filling kit, suitable for use in preparing a hardening sulfuric acid electrolyte in battery cells, comprising in three separate containers:

(A) sulfuric acid at a concentration of 50-80% by weight;

(B) a suspension of 6-12% by weight of silica in water; and (C) a water-in-oil emulsion of a polyelectrolyte which is a polymer or copolymer of acrylamide having a weight average molecular weight of at least 1,000,000 daltons, wherein said emulsion has a polymer content of 20-60% by weight, a density of $\rho = 1.03 \pm 0.02$ g/ml and a viscosity of $\eta = 300 \pm 100$ mPa.s.

7. The kit as claimed in claim 6, wherein in component A, said sulfuric acid is admixed with not more than 3% be weight of suspended silica.

8. The kit as claimed in claim 7, wherein said silica content is in the range of 1.3-1.5% by weight of the first starting component A.

9. The kit as claimed in claim 6, wherein the silica content is about 8% by weight in the second starting component B.

10. The kit as claimed in claim 6, wherein the polymer content in the emulsion is about 40% by weight in component C.

11. The kit as claimed in claim 6, wherein the silica used is pyrogenic $SiO_2$.

12. The kit as claimed in claim 11, wherein silica of the hydrophilic type is used.

13. The kit as claimed in claim 12, wherein silica of the hydrophobic type with surfactants as an additive is added to the hydrophilic silica.

* * * * *